United States Patent [19]

Farr

[11] 4,189,032
[45] Feb. 19, 1980

[54] HYDRAULICALLY-OPERATED DISC BRAKES FOR VEHICLES

[75] Inventor: Glyn P. R. Farr, Warwickshire, England

[73] Assignee: Girling Limited, Birmingham, England

[21] Appl. No.: 876,141

[22] Filed: Feb. 8, 1978

Related U.S. Application Data

[63] Continuation of Ser. No. 739,790, Nov. 8, 1976, abandoned.

[30] Foreign Application Priority Data

Nov. 7, 1975 [GB] United Kingdom ............... 46261/75

[51] Int. Cl.² .......................................... F16D 65/02
[52] U.S. Cl. .................................................. 188/73.3
[58] Field of Search ................ 188/71.1, 72.4, 72.5, 188/73.3, 73.4

[56] References Cited

U.S. PATENT DOCUMENTS

| | | | |
|---|---|---|---|
| 3,361,229 | 1/1968 | Swift | 188/72.4 |
| 3,495,689 | 2/1970 | Peach | 188/72.4 |
| 3,651,898 | 3/1972 | Habgood | 188/72.5 |
| 3,682,277 | 8/1972 | Brown | 188/73.3 |
| 3,712,422 | 1/1973 | Haraikawa et al. | 188/72.5 |
| 3,773,149 | 11/1973 | Toshida et al. | 188/72.5 |
| 3,917,033 | 11/1975 | Rath et al. | 188/73.3 |
| 3,917,034 | 11/1975 | Shimizu | 188/73.4 |
| 3,942,611 | 3/1976 | Burnett | 188/73.3 |
| 3,961,690 | 6/1976 | Schanz | 188/73.3 |
| 3,976,169 | 8/1976 | Ogawa | 188/73.3 |

Primary Examiner—Edward R. Kazenske
Attorney, Agent, or Firm—Scrivener, Parker, Scrivener & Clarke

[57] ABSTRACT

In a disc brake of the slidable reaction type in which an hydraulic actuator is located in a stationary member, a clamp member is guided for movement relative to the stationary member in a direction substantially parallel to the axis of the disc by means of a pin which is connected to one of the members and is slidably mounted in the other member.

14 Claims, 22 Drawing Figures

HYDRAULICALLY-OPERATED DISC BRAKES FOR VEHICLES

This is a continuation of application Ser. No. 739,790, filed Nov. 8, 1976, now abandoned.

SPECIFIC DESCRIPTION

This invention relates to improvements in hydraulically operated disc brakes for vehicles, the disc brakes being of the kind comprising a stationary drag-taking member located adjacent to a rotatable disc, a clamp member comprising a yoke extending over the peripheral edge of the disc and slidably mounted on the stationary member for movement in a direction substantially prarallel to the axis of the disc, friction pad assemblies for engagement with opposite faces of the disc, and an hydraulic actuator in the stationary member for applying one of the pad assemblies, known as the directly actuated pad assembly, directly to the adjacent face of the disc, the other friction pad assembly, being carried by the clamp member and being applied to the other face of the disc by the reaction of the actuating means which causes the clamp member to slide with respect to the disc in a substantially axial direction, the drag on the indirectly actuated friction pad assembly being transmitted to the stationary member through the clamp member, and the hydraulic actuator comprising oppositely acting first and second pistons located in an hydraulic cylinder and of which the first acts on the directly actuated friction pad assembly and the second acts on the clamp member.

In one known disc brake of the kind set forth the clamp member is guided in grooves in the circumferentially outermost sides of the stationary member. The grooves are exposed to the elements so that interengaging slide surfaces are liable to rust or corrode which will impede operation of the brake. By providing large clearances between the clamp member and the grooves, rust and corrosion can be prevented from impeding operation, but when the direction of disc rotation is reversed and the brake is applied, the application of the brake is noisy due to a "clonk" which occurs due to the engagement of the clamp member with the stationary member as the clamp member tends to be carried round by the indirectly actuated friction pad which it carries.

According to our invention in a disc brake of the kind set forth for vehicles for the clamp member is mounted on the stationary member for relative sliding movement in an axial direction by means of a pin which is connected to one of the members and is slidably mounted in the other member.

This construction has the advantage that it is not necessary to provide extra thicknesses of material or high strength material in the brake to support the pin. The hydraulic cylinder will already be surrounded by a sufficient thickness of material that it will never distort and trap the piston. This provides a inherently rigid support for the pin or its slidable mounting without any further adaptations of the brake being necessary. The disc straddling part of the brake is usually made of high strength material. Thus rigid supports are provided for the pin and its mounting without adding to the cost of the brake and without compromising other aspects of brake design.

The pin may comprise the sole slidable connection between the members and in all cases acts as the main drag-transmitting member through which the drag on the indirectly actuated friction pad assembly is transferred through the clamp member and onto the stationary member when the brake is applied.

By providing the pin eliminates the need for providing other exposed sliding surfaces between the members.

Preferably a sealing boot is provided to seal the sliding surfaces of the pin from atmosphere.

Conveniently the pin is fixedly secured in the clamp member and is slidably guided in a blind bore in the stationary member.

The bore in the stationary member is alongside the rigid hydraulic cylinder and is therefore very robustly supported. The cylinder is cast in ordinary cast iron and the yoke is made from high strength material such as S.G. iron.

This construction also has the advantage that as the indirectly actuated friction pad assembly wears the confined space between the free end of the pin and the base of the blind bore expands to create a vacuum. In turn this tends to move the indirectly actuated friction pad assembly away from the disc, against the friction of an hydraulic seal carried by the second piston, thereby providing positive retraction of the indirectly actuated friction pad assembly away from the disc when the brake is released.

Preferably, the pin is located at the circumferential side of the brake at which any given point on the disc first comes into alignment when the disc is rotating in a normal forward direction, and the directly actuated friction pad assembly is guided in the stationary member between spaced arms which extend towards the disc. Thus, when the brake is applied with the disc rotating in a normal forward direction, the drag on the directly actuated pad assembly is taken by the arms at the end of the brake remote from the pin, so that the stationary member is subjected to substantially balanced drag forces.

Anti-rotation means are preferably incorporated for preventing the clamp member for rotating about the pin as an axis. The anti-rotation means can take any convenient form and may comprise a second connection between the two members, for example a second non-drag taking pin, or a coupling between the second piston and the clamp member.

When the second piston is hollow and acts at its open end on the clamp member the coupling can be connected to the clamp member and be received in the bore of the piston.

Conveniently the pin is located as close as possible to the drag line comprising a tangent to the disc passing through the centre of pressure of the pad assemblies. In this way the anti-rotation connection is relieved of drag forces.

The pin is preferably located wholly on one axial side of the disc. It then does not occupy space between the disc and the wheel which can otherwise be occupied by the clamp member.

Some embodiments of our invention are illustrated in the accompanying drawings in which.

Figure 1:
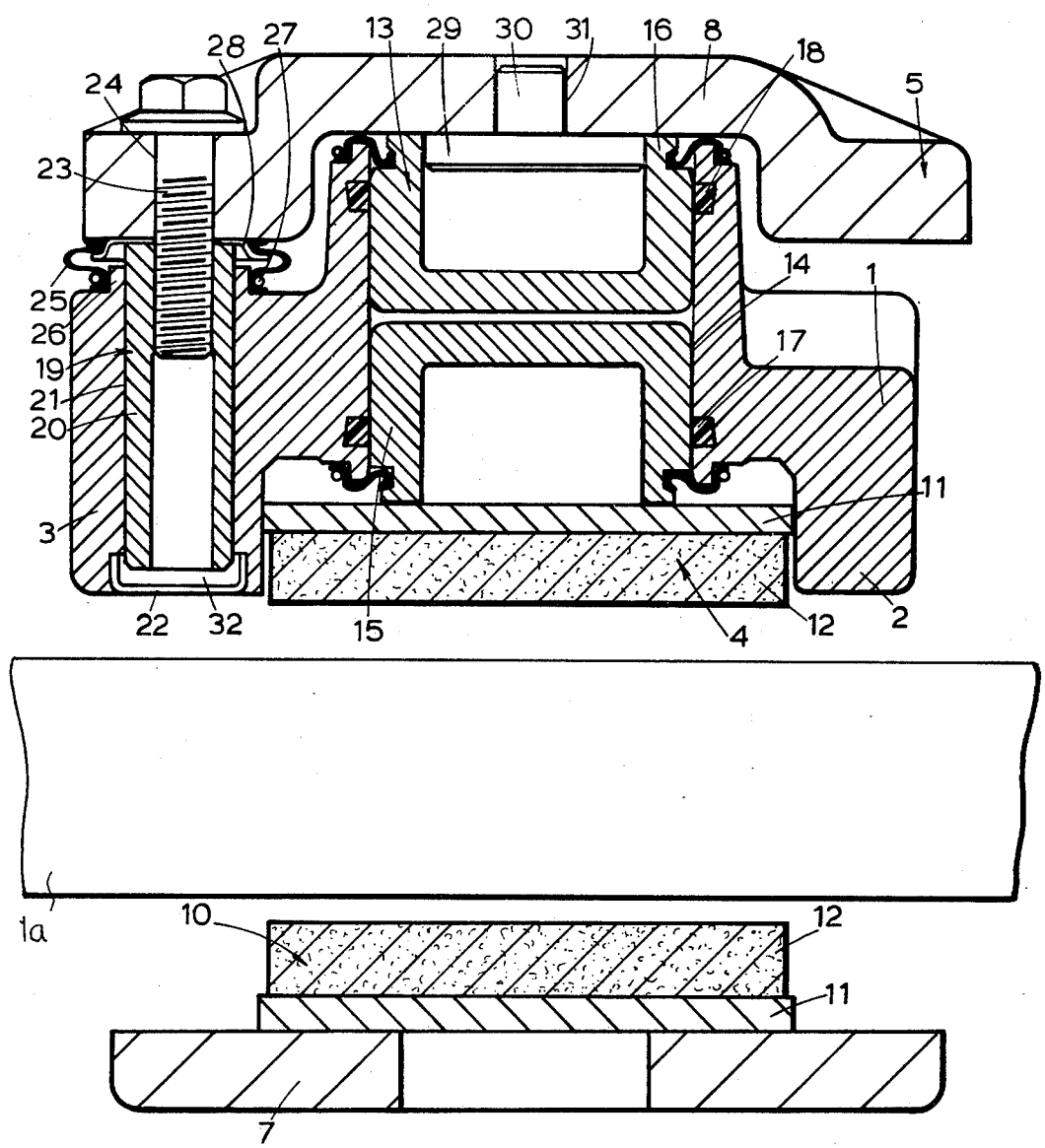
FIG. 1 is a section through a hydraulically operated disc brake for vehicle taken on a chord passing through the disc.
Figure 2:
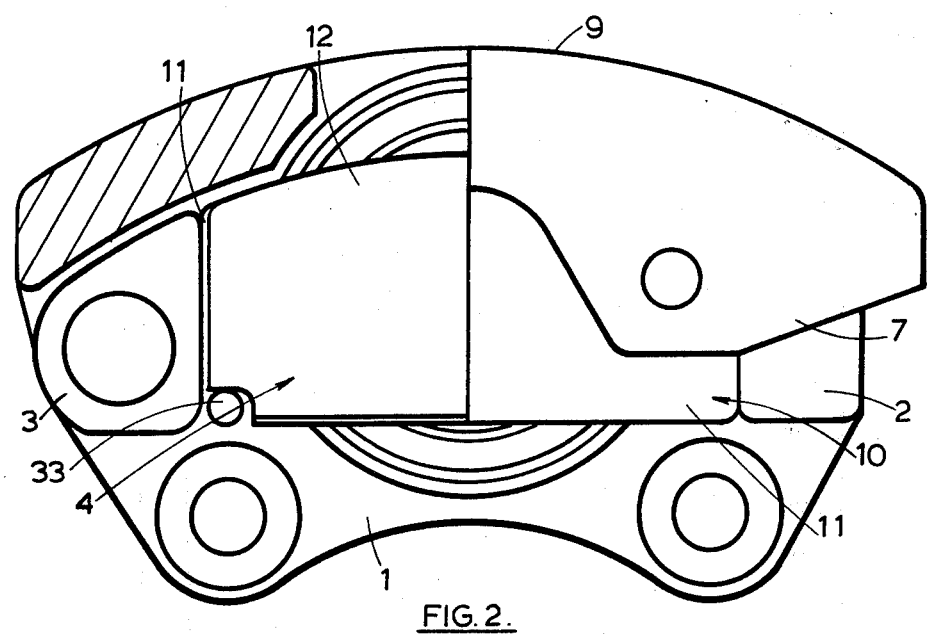
FIG. 2 is an elevation of one end of the brake including a half section in the plane of the disc.
Figure 3:
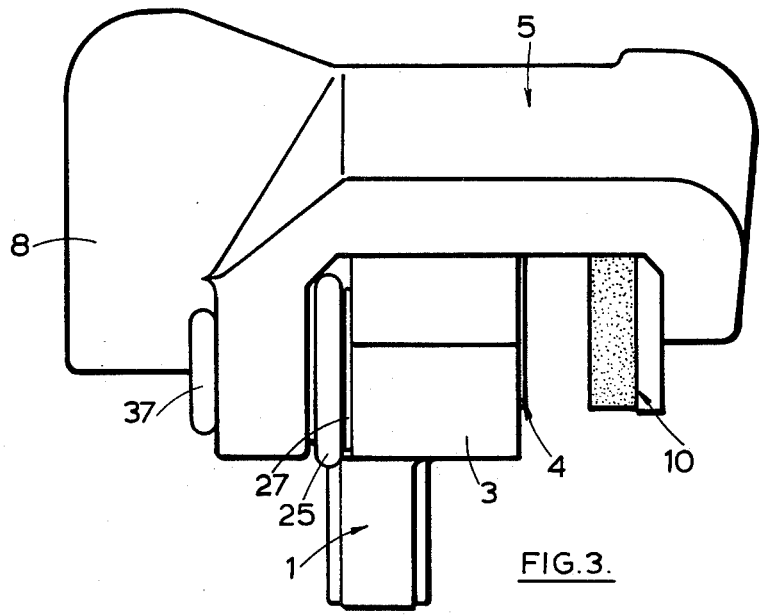
FIG. 3 is a side elevation of another brake.
Figure 4:
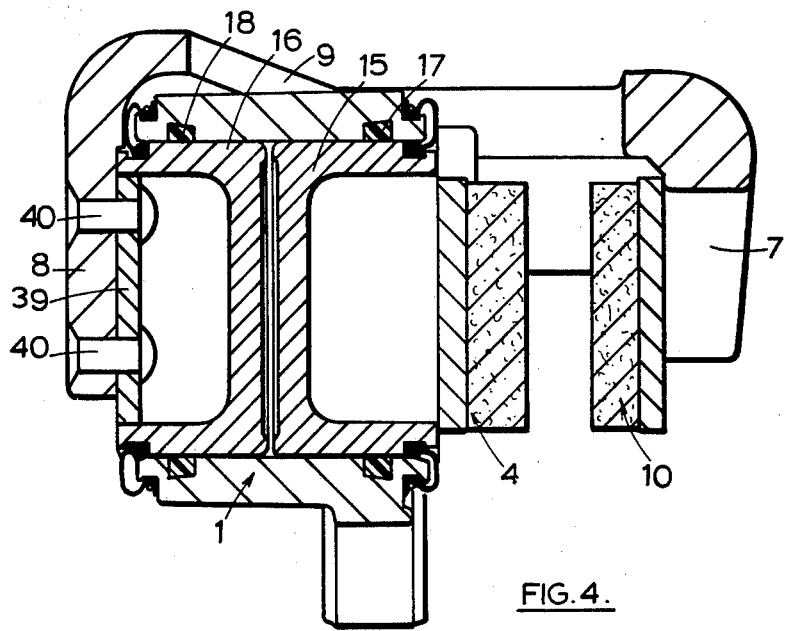
FIG. 4 is a longitudinal section through the brake of FIG. 3.
Figure 5:
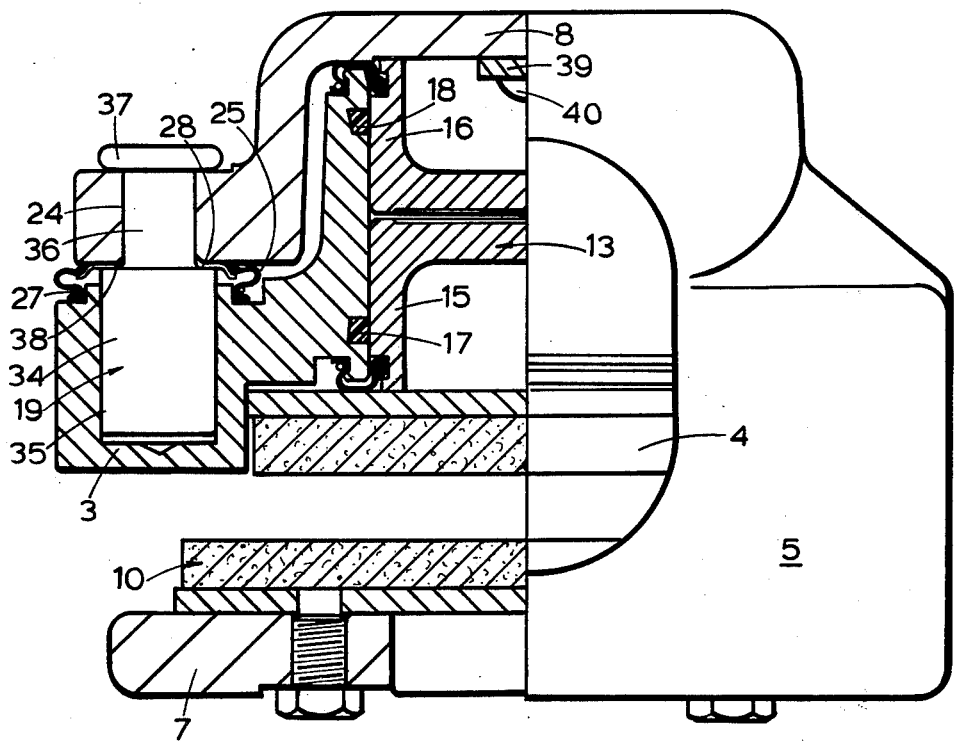
FIG. 5 is a plan including a longitudinal section through one half of the brake on a chord passing through the axis of the pin.
Figure 6:
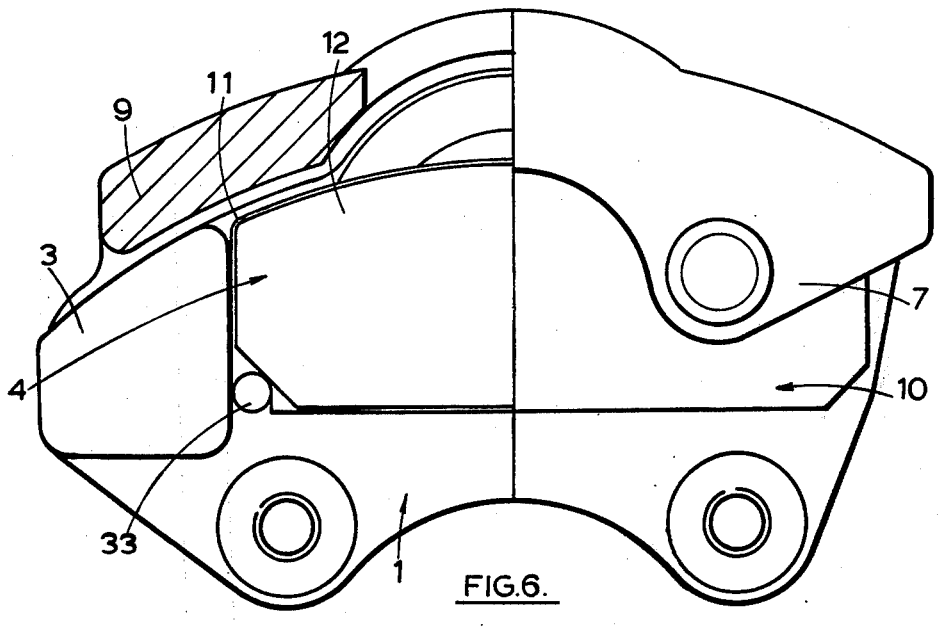
FIG. 6 is an end elevation on the line 6—6 of FIG. 5 including a part section.

In the disc brake illustrated in FIGS. 1 and 2 of the drawings, a stationary member 1 is mounted on a stationary part adjacent to one face of a rotatable disc (not shown), and the stationary member is provided with circumferentially spaced arms 2, 3 which terminate close to the disc and between which a directly actuated friction pad assembly 4 for engagement with the said one face of the disc is guided for axial movement with respect to the disc.

A clamp member 5 comprising a yoke of generally U outline straddles the peripheral edge of the disc and the stationary member 1. The clamp member 5 comprises axially spaced inwardly directed limbs 7 and 8 which are interconnected by a bridge piece 9, and the limb 7 which is remote from the stationary member carries an indirectly actuated friction pad assembly 10 for engagement with the adjacent face of the disc.

As illustrated each friction pad assembly comprises a rigid backing plate 11 carrying a pad 12 of friction material.

An hydraulic actuator 13 is incorporated in the stationary member 1. As illustrated the actuator 13 comprises an open-ended cylinder bore 14 in which work opposed first and second hollow pistons 15 and 16 arranged with their open ends facing away from each other, and the pistons 15 and 16 slide through axially spaced hydraulic seals 17 and 18 in the wall of the cylinder bore 14. The first piston 15 acts directly on the directly actuated friction pad assembly 4, and the second piston 16 acts on the limb 8.

A pin 19 located at one end of the brake provides the sole slidable direct connection between the clamp member 5 and the stationary member and the two members are otherwise disconnected. As illustrated the pin comprises an internally threaded sleeve 20 which is guided to slide in a bore 21 which extends axially through the arm 3 and is closed at one end adjacent to the disc by means of a sealing cap 22 received in a counterbore at that end. The arm 3 is increased in length, both circumferentially and axially, to accommodate the sleeve 20, and the sleeve 20 is connected to the limb 8 by means of a bolt 23 which is screwed into the bore of the sleeve 20 through an opening 24 in the limb 8.

A flexible sealing boot 25 seals the exposed end portion of the sleeve 20 from atmosphere. The boot 25 is connected at one end to a boss 26 integral with the arm 3 by means of a spring ring 27, and at the other end is clamped between the limb 8 and a retainer 28 which, in turn, is clamped between the limb 8 and the adjacent end of the sleeve 20.

When the brake is applied by pressurisng the cylinder 14 to separate the pistons 15 and 16, the directly actuated friction pad assembly 4 is applied directly to the disc by the first piston 15, and the indirectly actuated friction pad assembly 10 is applied simultaneously and indirectly to the opposite face of the disc by the second piston 16 which acts through the clamp member 5, causing the clamp member 5 to move axially with respect to the stationary member 1 with the sleeve 20 sliding in the bore 21. The drag on the directly actuated pad assembly 4 is taken by the arm 2, 3 at the end of the brake with which any point on the disc last comes into alignment in that direction of disc rotation, and the drag on the pad assembly 10 is taken by the clamp member 5 and transmitted to the stationary member 1 through the sleeve 20.

Preferably for a normal forward direction of disc rotation the arm 2 takes the drag on the pad assembly 4 so that the drag is substantially shared between the arms.

The axis of the pin 19 is displaced radially inwards with respect to the drag line and the clamp member 5 is coupled to the piston 16 by anti-rotation means to prevent the clamp member 5 from rotating about the pin 19 as an axis when the brake is applied. As illustrated the anti-rotation means comprises a circular member 29 which is a good fit in the bore of the piston 16 and is carried by a spigot 30 engaged in an opening 31 in the limb 8.

As the pad 12 of the indirectly actuated friction pad assembly wears and the sleeve 20 is withdrawn, a space 32 between the inner end of the bolt 23 and the sealing cap 22 is subjected to vaccum which tries to move the pad assembly 10 away from the disc, against the friction in the seal 18. This provides a positive retraction for the indirectly actuated friction pad assembly 10.

Spaced pins, of which one is shown at 33, extend axially towards the disc from the stationary member 1 and support the directly actuated pad assembly 4 against movement in a radially inwards direction.

To replace the pad assemblies 4 and 10 the clamp member 5 can be moved angularly relative to the stationary member 1 with the pin 19 rotating in the bore 21. Of course, the member 29 must first be disengaged from the piston 16. This can be achieved by first removing the pad assembly 10 to permit the clamp member 5 to move axially with respect to the piston.

Alternatively the clamp member 5 may be provided with an opening of substantial dimensions through which the pad assemblies can be withdrawn.

In the brake illustrated in FIGS. 3 to 6 the pin 19 comprises a stud 34 which is guided to slide in a blind bore 35 in the arm 3, and the stud 34 has an extension 36 of reduced diameter which projects through the bore 24 and is permanently secured in position by rivetting over or otherwise deforming the free end of the extension into a head 37 engaging with the limb 8. The retainer 28 is clamped between a plane shoulder 38 at the step in diameter and the limb 8.

The anti-rotation coupling comprises a radially extending strip of metal 39 which is secured by rivets 40 to the inner face of the limb 8, and the strip 39 is received in the piston 16 and has radiused ends engaging with the wall thereof at diametrically opposed positions. The strip 39 can be relatively narrow in a circumferential direction since it is necessary only to locate the clamp member 5 with respect to the stationary member 1 in a radial direction.

The construction and operation of the brake shown in FIGS. 3 to 6 is otherwise the same as that described above with reference to FIGS. 1 and 2 and corresponding reference numerals have been applied to corresponding parts.

Figure 7:
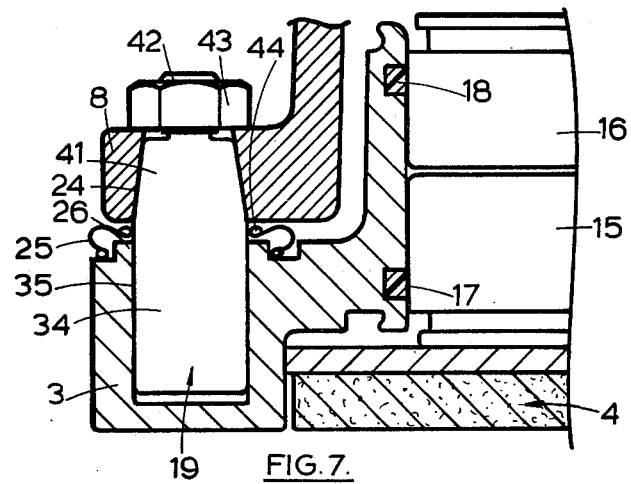
FIG. 7 is a view of the sectioned part of FIG. 5 showing a modified pin.
Figure 8:
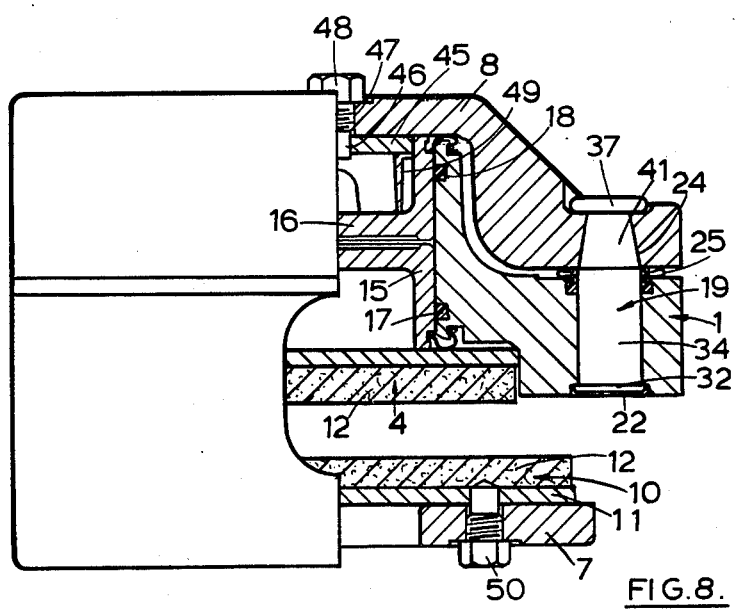
FIG. 8 is a section similar to FIG. 7 of another modified construction.
Figure 9:
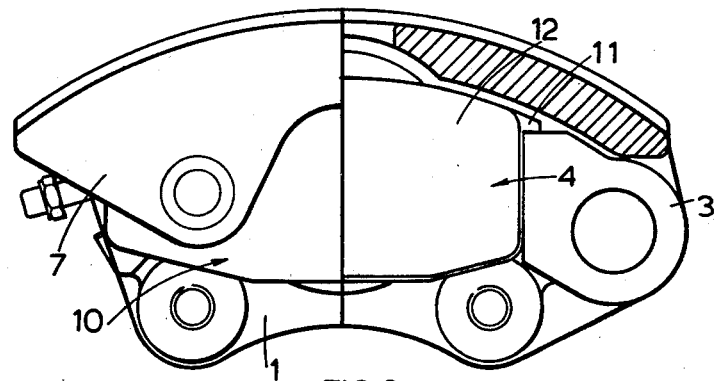
FIG. 9 is an elevation of one end of the brake shown in FIG. 8 including a half section on the plane of the disc.
Figure 10:
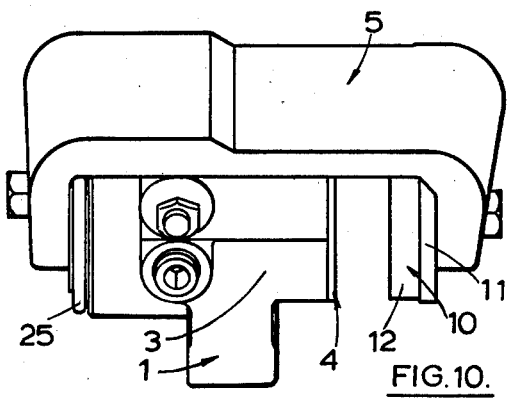
FIG. 10 is a side elevation of the brake of FIG. 8.
Figure 11:
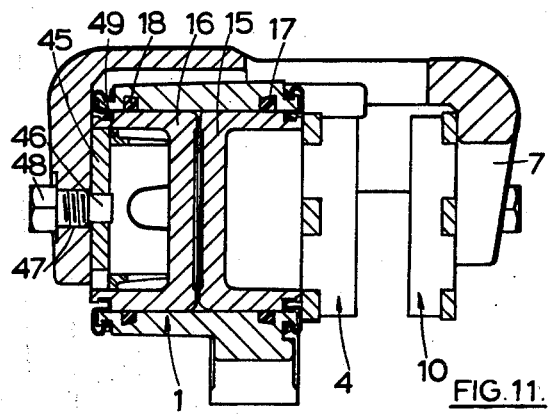
FIG. 11 is a longitudinal section through the brake of FIG. 8.

In the construction illustrated in FIG. 7 the plane shoulder 38 is omitted and the stud 34 leads into an extension 41 of frusto conical outline received in the bore 24 which is of complementary outline. The extension 41 has a threaded spigot 42 of reduced diameter which receives a nut 43, for example of the self-locking type, to clamp the stud relative to the limb 8. The boot 25 is retained in position at its end adjacent to the limb 8 by means of a spring clip 44.

In the construction illustrated in FIGS. 8 to 11 the stud 34 is similar to the stud shown in FIG. 7. The stud is secured in a groove in the limb 8 by hot-rivetting. The boot 25 is a tight, no-slip fit on the pin.

The anti-rotation coupling comprises a circular plate 45 which is eccentrically mounted on a spigot 46 secured in an opening 47 in the limb 8 by a bolt 48. A plastic spacer 49 prevents the plate 45 from falling into the second piston 16. Alternatively a step could be provided in the piston for this purpose.

In order to change pads the bolts 48,50 are removed, leaving the yoke free to pivot about the stud 34 without engaging the disc. The pads can then be replaced. Hence the hydraulic components of the brake are not disturbed during pad changes.

Figure 12:
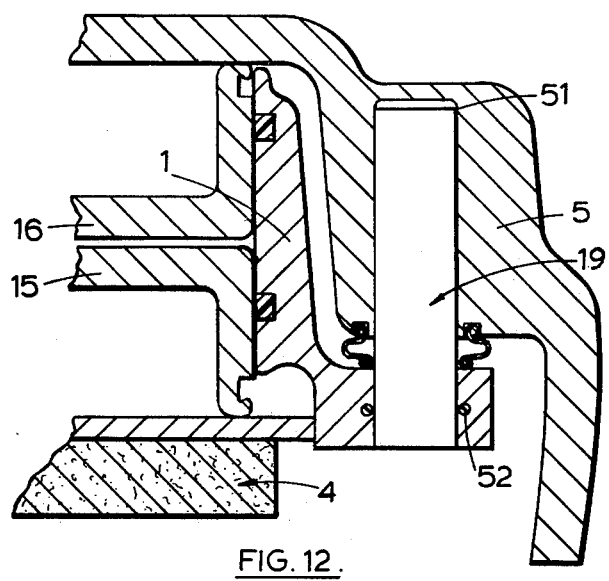
FIG. 12 is a section similar to FIG. 7 of another modified construction.

FIG. 12 shows a construction in which the pin 19 comprises a cylindrical member which is guided to slide in a bore 51 in the clamp member 5. The pin is fixed in a bore portion in the stationary member 1 by an interference fit illustrated diagrammatically by the spots 52.

Figure 13:
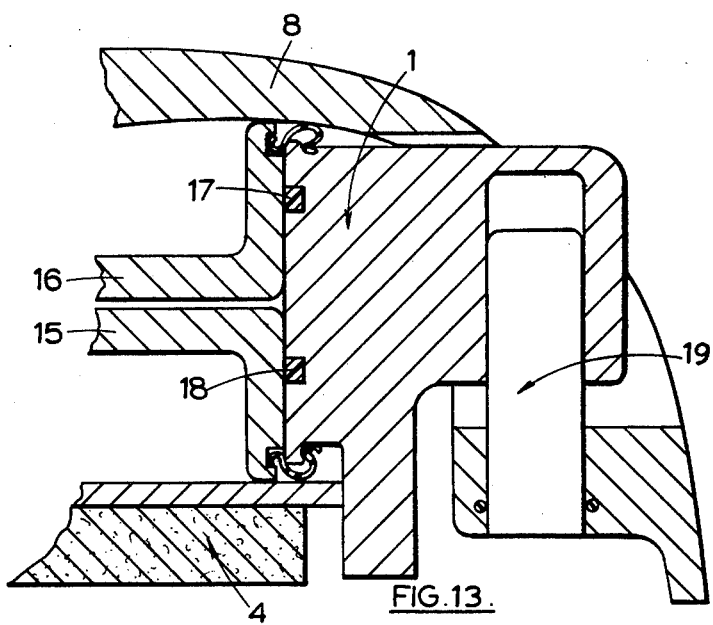
FIG. 13 is a section similar to FIG. 7 of another modified construction

FIG. 13 shows a modification in which the pin 19 is fixed in a bore in the yoke 5 adjacent to the disc (not shown) and slides in a bore provided in an extended part of the stationary member 1.

Figure 14:
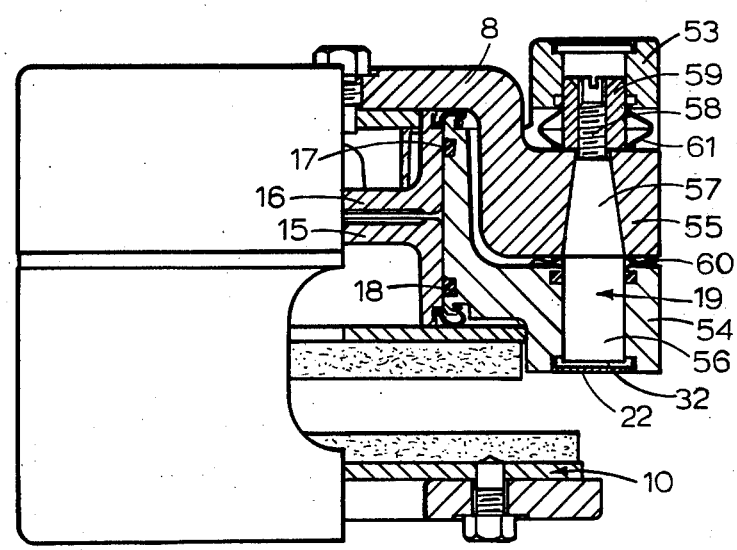
FIG. 14 is a section similar to FIG. 7 of another modified construction.

In the modified construction illustrated in FIG. 14, the stationary member 1 and the clamp member 5 are provided with interdigitated fingers 53, 54 and 55 respectively. The pin 19 extends through coaxial bore portions in the fingers. The pin 19 comprises a cylindrical portion 56 which is slidable in the bore in finger 54 and a frusto-conical portion 57 received in a bore of complementary outline in the finger 55 of the clamp member 5. The portion 57 has a threaded extension 58 of reduced diameter which is received in sleeve 59 slidable in a bore in finger 53. Flexible sealing boots 60,61 seal the exposed portions of the pin 19 and sleeve 59 between the faces of adjacent pairs of fingers from the atmosphere.

Figure 15:
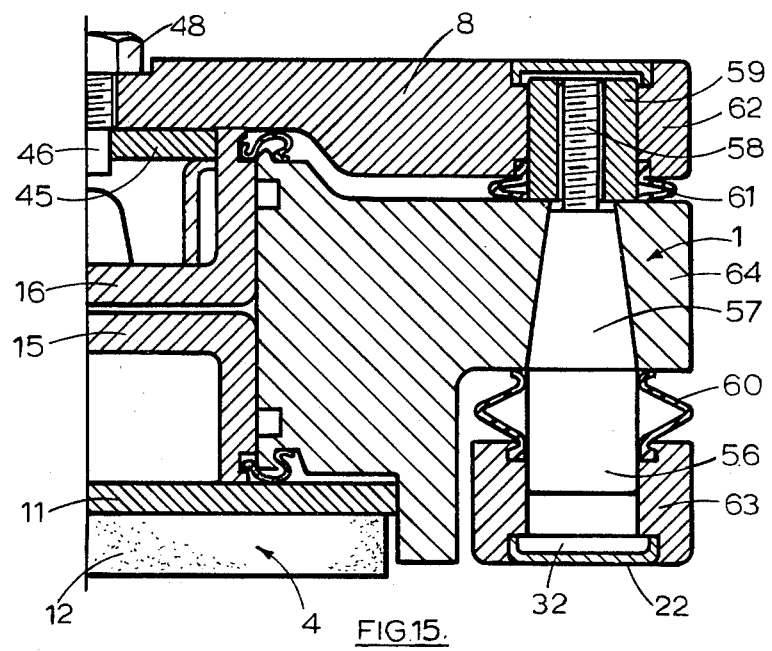
FIG. 15 is a section similar to FIG. 7 of another modified construction.

FIG. 15 shows an inverted version of the construction of FIG. 14. In this the yoke 5, rather than the stationary member 1 is of bifurcated construction and has two fingers 62, 63. The stationary member 1 has a single finger 64 positioned between fingers 62, 63. The construction of the pin 19 and the bores in the fingers is exactly the same as in FIG. 14, the frusto-conical portion being received in a complementary bore in the finger 64 in the stationary member rather than the yoke.

The constructions shown in FIGS. 14 and 15 are extremely strong since the pin 19 acts as a simple support beam. They are therefore suitable for heavy duty brakes.

Figure 16:
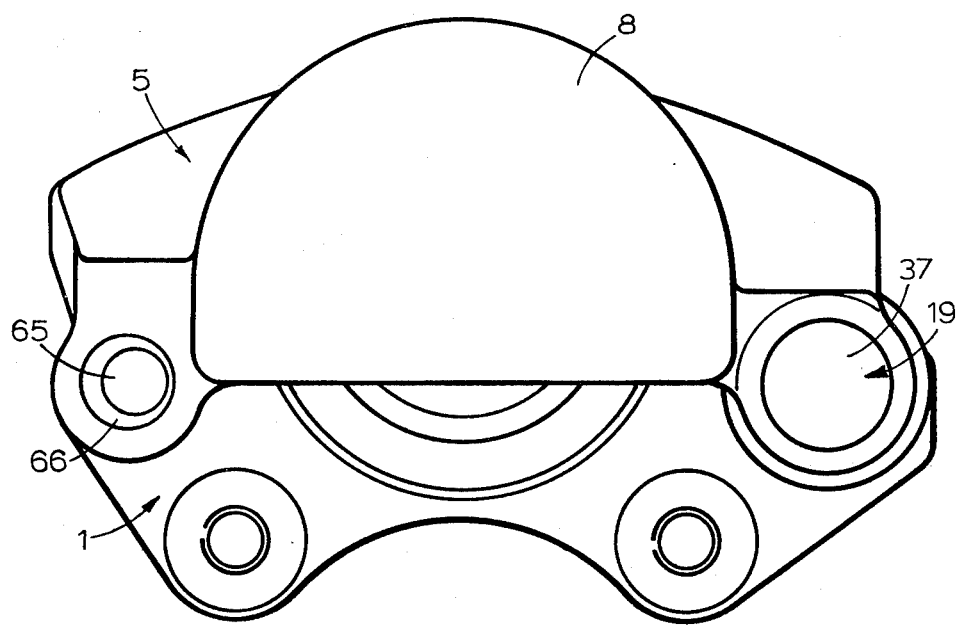
FIG. 16 is an end elevation similar to FIG. 5 of a modified brake.

In the brake of FIG. 16 the anti-rotation coupling comprises a bolt 65 screwed into an eccentric bush 66 slidably received in an opening in the stationary member 1.

Figure 17:
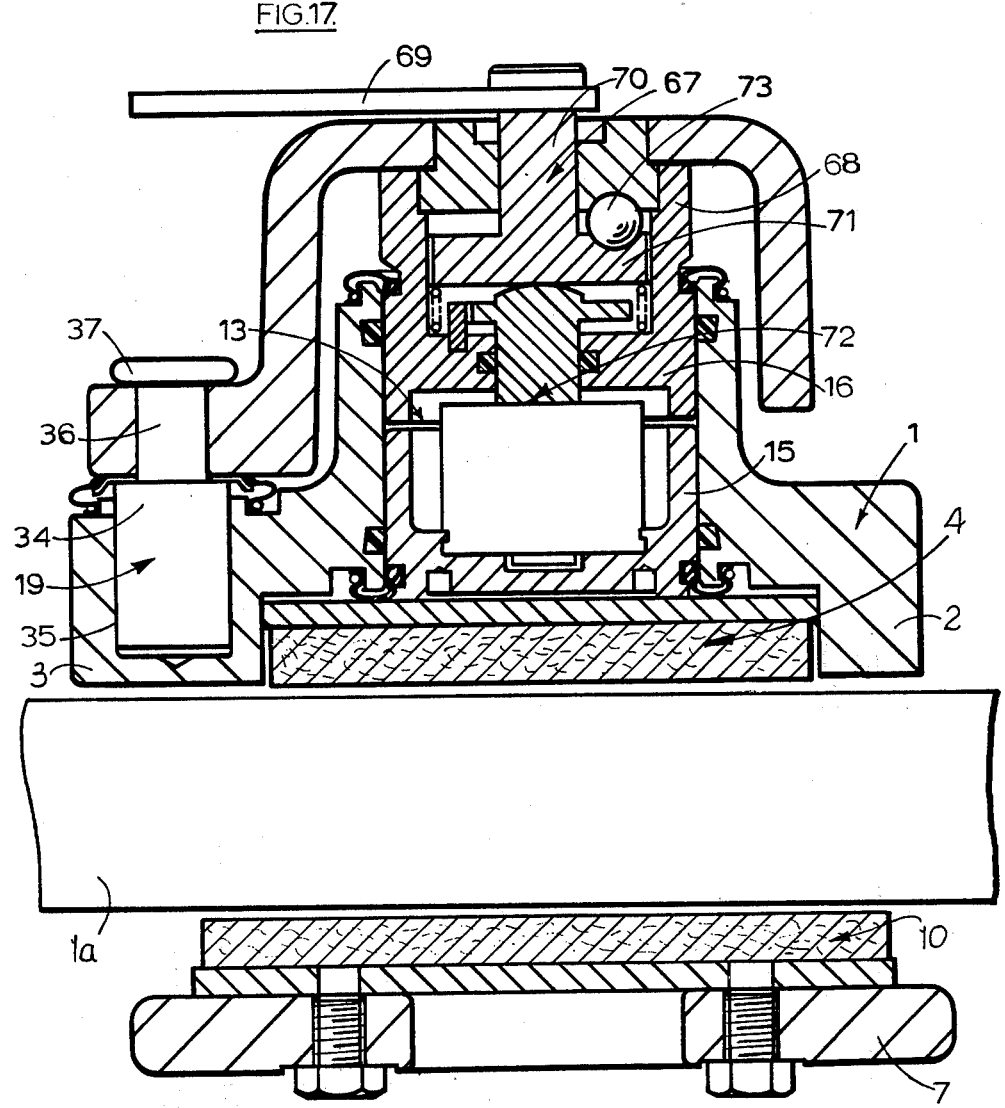
FIG. 17 is similar to FIG. 5 showing the addition of a hand brake applying mechanism.

Our invention has the advantage that the brake can be readily adapted to incorporate a hand brake applying mechanism. As illustrated in FIG. 17 hand brake applying mechanism 67 is incorporated in an extension 68 of the outer piston 16 and acts between the limb 8 and the inner piston 15. The mechanism comprises an operating arm 69 splined on a shaft 70. An annular cam 71 is formed integrally with the shaft 70 and bears on one end of strut means 72 which acts on the inner piston 15. Three balls 73 are mounted in inclined grooves formed in the cam and the undersurface of the extension 68. When the arm 69 is rotated the shaft 70 and cam 71 are rotated, thus causing displacement of the balls 73 in the grooves. This results in axial displacement of the strut means 72 and consequent application of the brake.

Figure 18:
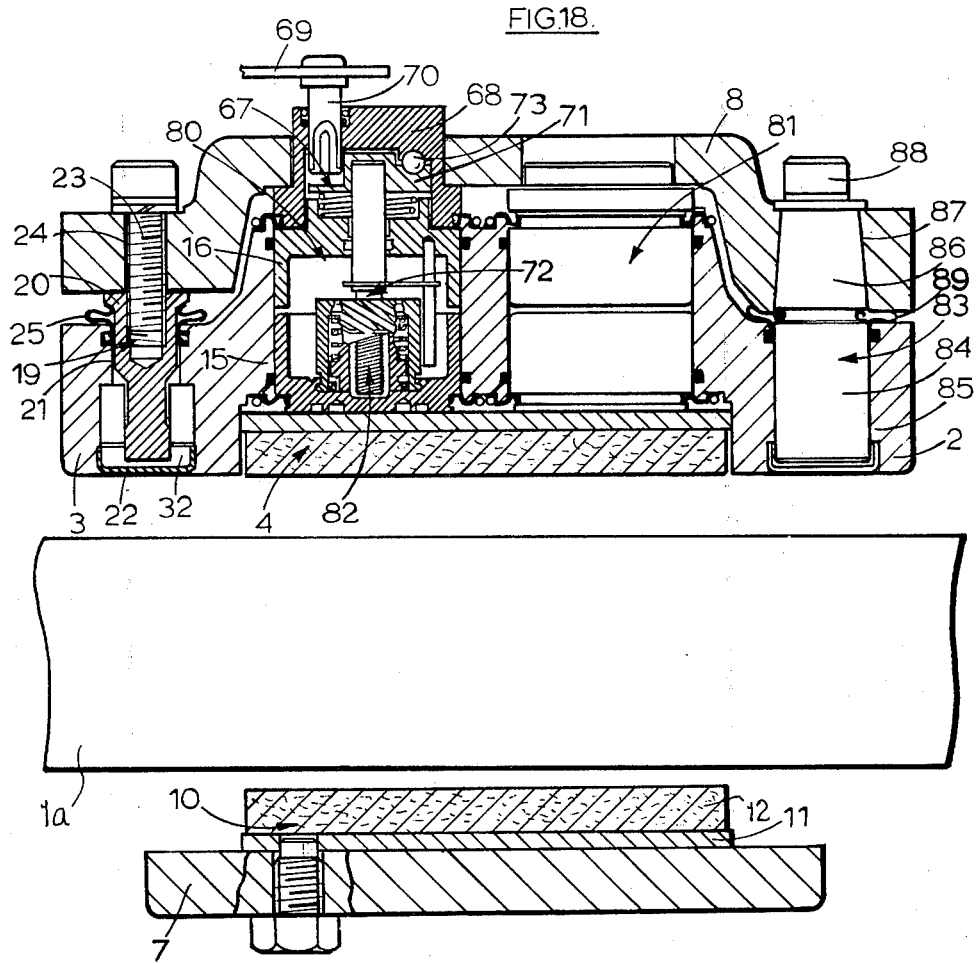
FIG. 18 is similar to FIG. 17 showing another hand brake applying mechanism.
Figure 19:
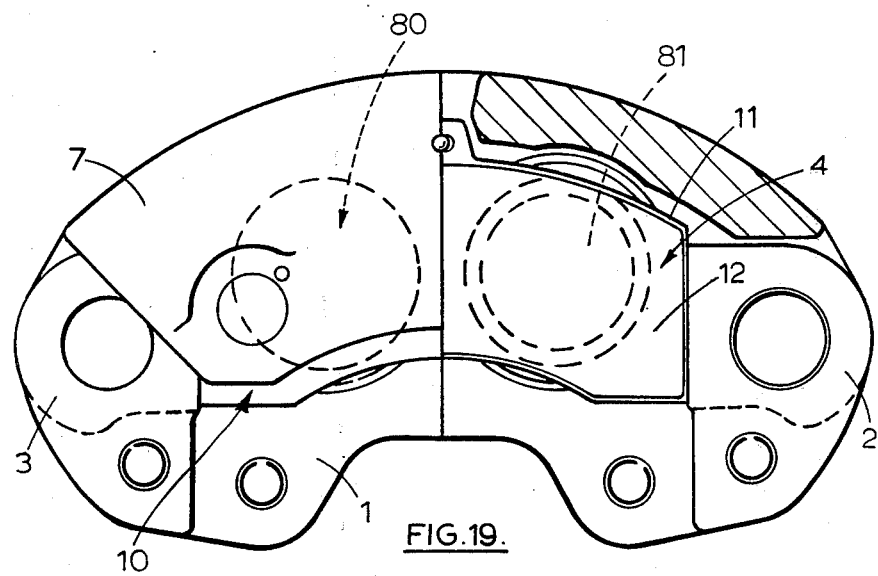
FIG. 19 is an elevation of one end of the brake shown in FIG. 18 and including a half section on the plane of the disc.
Figure 20:
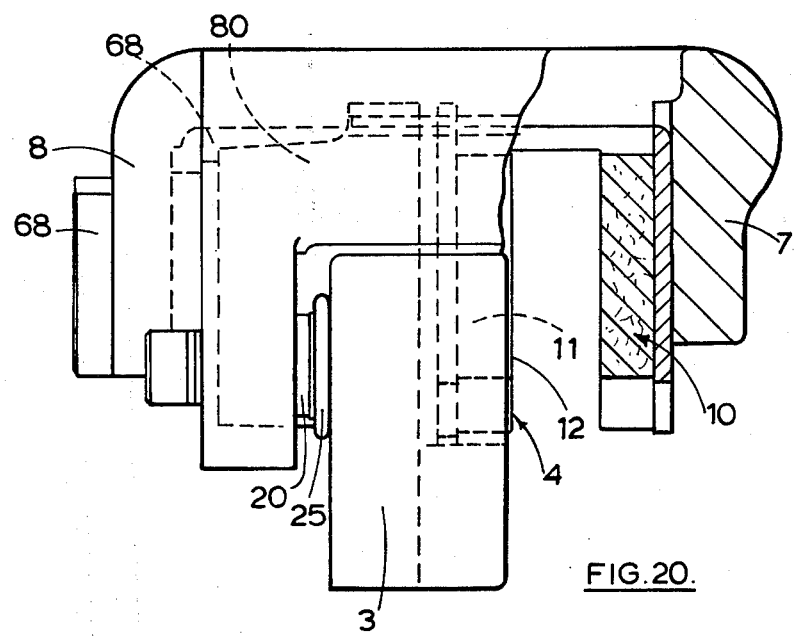
FIG. 20 is a partially sectioned side elevation of the brake shown in FIG. 18.

In FIGS. 18 to 20 corresponding reference numerals has been used for parts corresponding to those described in FIGS. 1 to 17 above.

FIGS. 18 to 20 show a larger variety of brake incorporating twin hydraulic actuators 80,81. A hand brake applying mechanism 67 which is similar to that shown in FIG. 17 is incorporated in the piston 16 of actuator 80.

The strut means 72 incorporates a slack adjuster mechanism 82.

The pin 19 is slidable in a bore 21 in the arm 3 of the stationary member. The pin 19 is of similar construction to that shown in FIG. 1. A second pin 83 provides an anti-rotation connection between the limb 8 and the arm 2 of the stationary member. The second pin 83 comprises a cylindrical portion 84 which is a clearance fit in a bore 85 in the arm 2 and a frusto-conical extension 86 received in a complementary bore 87 in the limb 8. A nut 88 clamps the pin 83 against rotation relative to the limb 8.

A flexible boot 89 seals the exposed area of the pin 83 from the atmosphere, the boot also providing anti-rattle and resilient centralising of the pin.

Figure 21:
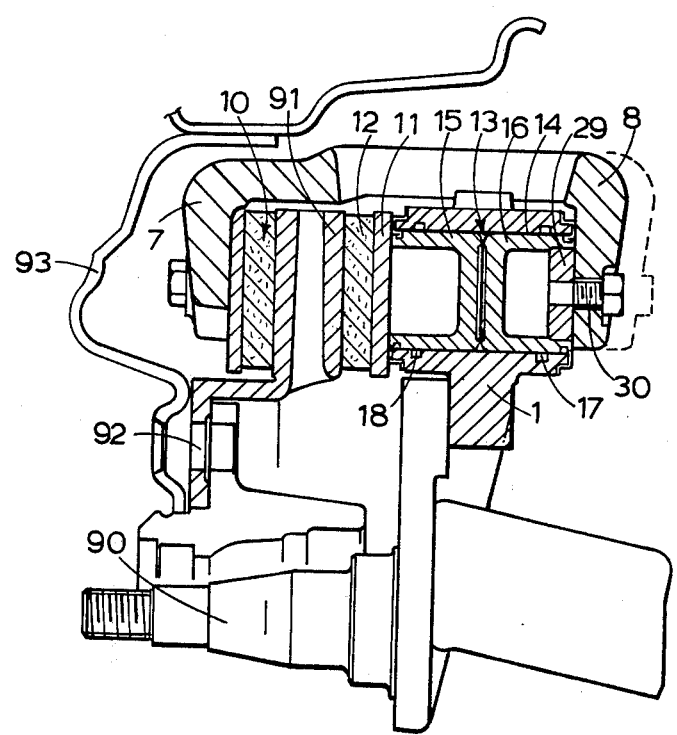
FIG. 21 is a longitudinal elevation of the brake shown in FIG. 1, showing the brake installed in a road wheel layout.
Figure 22:
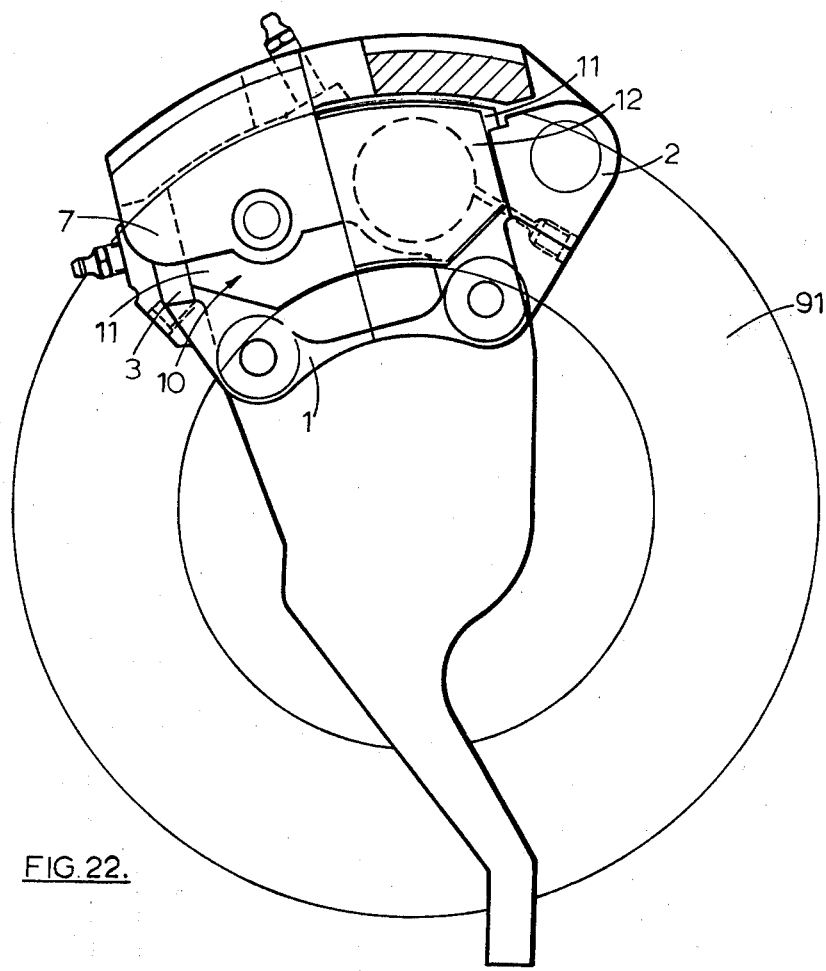
FIG. 22 is an elevation similar to FIG. 9 of one end of the brake shown in FIG. 21.

FIGS. 21 and 22 show a disc brake of similar construction to that shown in FIGS. 1 and 2 installed in a typical road wheel layout. The stationary member 1 is fixed to the hub axle 90 of the wheel. The rotatable disc 91 is bolted at 92 to a part of the wheel housing 93.

In an alternative arrangement the boot sealing the sliding surfaces of the pin from the atmosphere is replaced by a bushing or aperture sleeve, the pin and sleeve combination being non-corrosive. For example, the pin may be stainless steel and the sleeve may be brass.

The brake described in the embodiments above has the advantages that the guide is mounted rigidly and robustly without incurring any substantial increase in the cost or weight of the brake, the brake is easy to manufacturer and the pads can be changed easily without disturbing the hydraulic system. This brake construction substantially eliminates noise, or "klonk," of the yoke against its guiding surface, which often arose previously when a vehicle was braked, particularly on a slope, due to the yoke hitting against its guide surface. In this brake the yoke is guided on a pin and thus this problem does not to arise to any great extent. The arrangement also substantially eliminates the risk of seizure of the yoke due to corrosion or ingress of dirt between the guiding surfaces.

In the majority of the embodiments described a above the anti-rotation coupling is provided in the indirect piston, which is already sealed, lubricated and booted thus eliminating the need for extra seals for the anti-rotation coupling.

The form of the yoke in the above arrangements is such that it fits easily in the restricted gap between the disc and the wheel of a vehicle. The circumferential extremities of the yoke can be positioned at the centres of pressure of the pad assemblies such that the separation movement of the yoke limbs on application of the brake is restricted. The engagement of the yoke with the pads may be of small area such that some pad to clamp articulation is possible, as required in some commercial vehicles.

I claim:

1. An hydraulically operated disc brake for a vehicle comprising a rotatable disc, a stationary drag-taking member located adjacent to said rotatable disc, a clamp member comprising a yoke extending over the peripheral edge of said disc, guide means between said clamp member and said stationary member such that said clamp member is guided for sliding movement in a direction substantially parallel to the axis of said disc, directly and indirectly actuated friction pad assemblies for engagement with opposite faces of said disc, and hydraulic actuating means in said stationary member for applying said directly actuated pad assembly directly to the adjacent first face of said disc, said indirectly actuated pad assembly being carried by said clamp member and being applied to the other second face of said disc by the reaction of said actuating means which causes said clamp member to slide with respect to said disc in a substantially axial direction, said hydraulic actuating means comprising an hydraulic cylinder carried by said stationary member, oppositely acting first and second pistons located in said cylinder, said first piston acting on said directly actuated friction pad assembly and said second piston acting on said clamp member, a first rigid mounting in said stationary member extending alongside said hydraulic cylinder, a second rigid mounting in said clamp member, said guide means consisting solely of a rigid pin received in both of said mountings, said pin being rigidly connected in one of said mountings and having a sliding engagement in the other of said mountings and being disposed wholly on one axial side of said disc adjacent to said first face, said clamp member straddling said stationary member with opposed axially extending surfaces of said members being spaced apart, said pin being constructed and arranged to transmit to said stationary member through said mounting means substantially all of the drag forces transmitted to said clamp member from said indirectly actuated pad assembly, said pin comprising the sole slidable connection between said clamp member and said stationary member, said clamp member otherwise having no direct connection with said stationary member, and anti-rotation means for preventing relative rotation between said clamp member and said pin comprising a coupling between said second piston and said clamp member.

2. A disc brake as claimed in claim 1, wherein a sealing boot seals sliding surfaces of said pin from the atmosphere.

3. A disc brake as claimed in claim 1, wherein one of said members has a blind bore in which said pin is slidably guided.

4. A disc brake as claimed in claim 1, wherein one of said members has an open bore in which said pin is slidably guided, a sealing cap closing a free open end of said bore.

5. A disc brake as claimed in claim 1, wherein said pin is fixedly secured in said clamp member and slidably guided in said stationary member.

6. A disc brake as claimed in claim 5, wherein said pin comprises an internally threaded sleeve, said stationary member mounting having a bore in which said sleeve is guided to slide, said clamp member having an opening, a bolt being screwed through said opening into the sleeve so as to fixedly secure said sleeve to said clamp member.

7. A disc brake as claimed in claim 5, wherein said pin comprises a stud of stepped outline.

8. A disc brake as claimed in claim 7, wherein said stud has an extention of reduced diameter, said clamp member mounting having a bore through which said extension projects and said extension being secured to said clamp member by rivetting.

9. A disc brake as claimed in claim 7, wherein said stud has an extension of frusto-conical outline, said clamp member mounting having a bore of complementary frusto-conical outline in which said stud is received.

10. A disc brake as claimed in claim 1, wherein said pin is located at the end of said brake at which any given point on said disc outside said damp member first comes into alignment when said disc is rotating in a normal forward direction and said stationary member has spaced arms which extend towards said disc and between which said directly actuated friction pad assembly is guided.

11. A disc brake according to claim 1, in which said second piston has a bore and acts at its open end, and said coupling is connected to said clamp member and received in said bore in said second piston.

12. A disc brake as claimed in claim 1, said stationary member and said clamp member mountings are provided with a total of at least three interdigited fingers, said fingers having co-axial bore portions through which said pin extends, said pin being slidably mounted in said fingers of one of said members and fixedly mounted in the or each said finger of said other member.

13. A disc brake as claimed in claim 12, wherein sealing boots seal exposed portions of said pin between adjacent fingers.

14. A disc brake as claimed in claim 12, wherein one of said members has two outer extending fingers and the other of said members has an inner extending finger positioned between said outer fingers and said pin comprises a first cylindrical portion slidable in said bore in one of said outer fingers, a second frusto-conical portion received in said bore in said inner finger which is of a complementary frusto-conical shape and a third threaded portion of reduced diameter, a sleeve being located slidably in said bore in said second outer finger and said third portion being receive in said sleeve.

* * * * *